(12) United States Patent
Dance et al.

(10) Patent No.: US 6,549,846 B1
(45) Date of Patent: Apr. 15, 2003

(54) ACCURATE VEHICLE NAVIGATION (75) Inventors: Scott Dance, Sunnyvale, CA (US);
James M. Janky, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 10/123,679

(22) Filed: Apr. 15, 2002

Related U.S. Application Data

(63) Continuation of application No. 09/718,653, filed on Nov. 21, 2000, now Pat. No. 6,385,532.

(51) Int. Cl.$^7$ ............................................. G01C 21/26
(52) U.S. Cl. ...................................................... 701/207
(58) Field of Search ............................ 701/23, 24, 200, 701/207, 215; 340/988, 991; 342/357.01, 357.06, 357.08

(56) References Cited

U.S. PATENT DOCUMENTS 6,385,532 B1 * 5/2002 Dance et al. ................ 701/207

* cited by examiner

Primary Examiner—Yonel Beaulieu (57) ABSTRACT

Method and system for accurate vehicle navigation and tracking within a selected lane on a roadway or a waterway. A location determination (LD) receiver, carried on the vehicle, receives LD signals from satellite-based LD signal sources, receives LD signal correction information from one or more other wide area LD correction sources, estimates a corrected vehicle location (good to within 10–50 cm) and velocity (optional) relative to one or more lane boundaries that define the selected lane, and displays vehicle location and velocity within the lane. When the vehicle approaches a lane boundary too quickly, or is too close to the lane boundary, an alarm signal or other control mechanism can be activated. The LD correction information is delivered to the LD receiver via a channel of suitable bandwidth. The system can also be used to map and store lane boundary coordinates for selected segments of a roadway or waterway.

14 Claims, 5 Drawing Sheets

ACCURATE VEHICLE NAVIGATION

RELATED APPLICATIONS

This is a continuation of U.S. patent application Ser. No. 09/718,653 filed Nov. 21, 2000 now U.S. Pat. No. 6,385,532.

FIELD OF THE INVENTION

This invention relates to accurate determination of location of a vehicle on a roadway or a waterway relative to a lane boundary.

BACKGROUND OF THE INVENTION

Satellite-based signal sources, such as the Global Positioning System (GPS) or Global Orbiting Navigational Satellite System (GLONASS) or Low Earth Orbit (LEO), for location determination (LD) can now provide corrected signals with relatively small associated inaccuracy. Previously, a vehicle navigation system might provide a map of a local region, including major roads, and provide an approximate graphical indication of the present location of a vehicle relative to the road system shown on the map. However, it is also of interest to provide a more detailed image showing the vehicle relative to a particular roadway or waterway on which the vehicle is presently located. Here, the associated inaccuracy should be no more than 50 cm, in order that the vehicle be accurately located relative to a particular lane in which the vehicle travels. It would not be sufficient here to merely estimate the vehicle and to provide a snap-to-grid operation that places the vehicle in the roadway or waterway lane that is nearest to the vehicle present location. This is especially true if the LD system is to provide automatic guidance within a roadway lane. If the vehicle "wanders" too far afield, the vehicle may collide with a vehicle in an adjacent lane that is moving in the same direction or in an opposite direction.

Another problem that arises here is communication to the vehicle of location correction information and related data that allows an on-board signal processor to determine the vehicle location with sufficient accuracy. Many vehicle communication systems available today only allow transmission of a few hundred bits of relevant information per second. This rather low rate of (correction) information transmission would not permit LD computations and corrections to be made at a rate (one or more times per second or more for each of three or more LD signals received) that is required for automated roadway or waterway guidance. A real time kinematic (RTK) system allows correction of LD signals, such as GPS signals, using LD correction signal sources that are spaced apart from the user by a distance that is usually no more than about 40 km, which strongly limits the region over which a vehicle can operate with one or a few RTK reference stations.

What is needed is a wide area LD correction system that estimates and provides corrected vehicle location up to several times per second, with an inaccuracy of no more than 10–50 cm within a selected roadway or waterway lane, and that indicates when the vehicle is too close to, and moving toward, a lane boundary. Preferably, the system should operate over a wide area, such as a region with diameter between 50 km and 5000 km. Preferably, the system should also determine a velocity at which the vehicle moves toward a nearest lane boundary. Preferably, the system should also allow accurate mapping of lane boundaries for a roadway or waterway.

SUMMARY OF THE INVENTION

These needs are met by the invention, which provides a Wide Area location information transmission and processing system that permits communication of location correction data for each of several LD signal sources and that permits computation of corrected location coordinates of a vehicle and graphical, alphanumeric or other display of vehicle location relative to a chosen roadway lane, with an associated inaccuracy of at most 10–50 cm and at a rate of several times per second. An LD correction system, such as DGPS or WAAS for the GPS, determines local corrections for pseudoranges or related measurements for visible LD signal sources (satellites) and uses a wireless transmission system, such as SDARS or FM subcarrier or Sky Station or Private Radio, with modest information transfer rate to deliver the LD correction information to an LD signal antenna and LD receiver carried on a subscriber vehicle. The vehicle LD receiver receives LD signals, corrects the LD signals using the LD correction information, computes the present location and (optionally) velocity of the vehicle relative to a selected roadway or waterway lane on which the vehicle travels. Optionally, the LD receiver provides an alarm-signal if the vehicle is approaching a lane boundary too quickly or is too close to a lane boundary. A Wide Area LD correction system can also be used to map boundaries for vehicle travel lanes to provide a database of boundary lane descriptions that can be subsequently used for Wide Area vehicle tracking within a travel lane.

As used herein a "Wide Area" LD correction system is an LD correction system with at least three sources of LD correction signals that are spaced at least a selected distance d1 apart, where a distance d2 between any location and each of at least two of these LD correction signal sources is greater than about 0.5 d1. The distance d1 may be chosen to be a suitably large value, such as 50 km, 100 km, 500 km or 1000 km.

DESCRIPTION OF BEST MODES OF THE INVENTION

Figure 1:
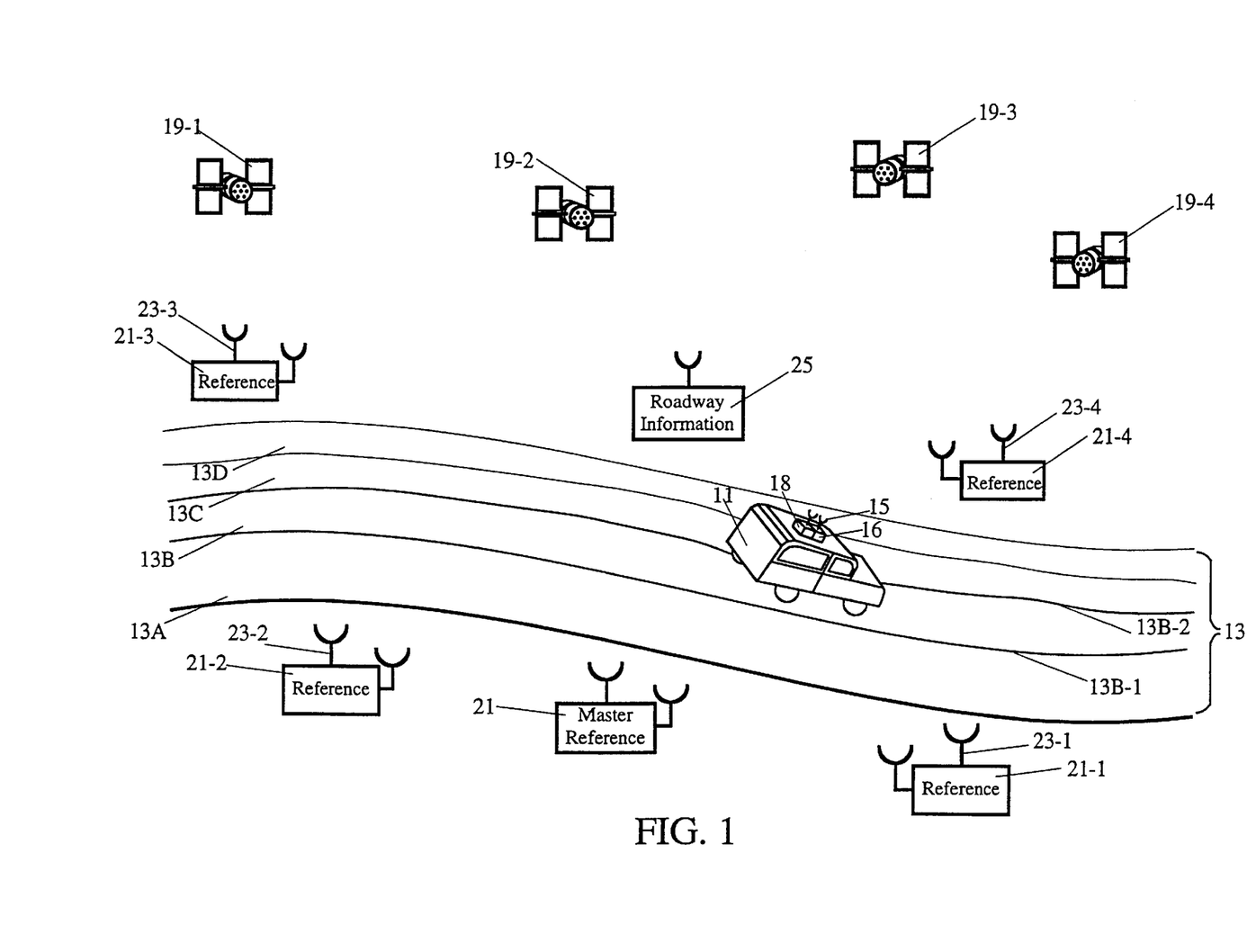
FIGS. 1, 2, 3 and 5 illustrate embodiments of the invention.

FIG. 1 illustrates practice of one embodiment of the invention. A vehicle 11 moves along a selected lane 13B of a roadway 13. The vehicle carries or has attached thereto a location determination (LD) signal antenna 15 and associated LD signal receiver 16 that receive LD signals from two or more, preferably four or more, satellite-based LD signal sources 19-1, 19-2, 19-3, 19-4. The LD signal sources 19-j (j=1, 2, 3, 4) may be part of an LD system such as GPS, GLONASS, LEO (low earth orbit) or other similar LD system that provides timed, frequency-distinguishable and/or coded signals, transmitted from a plurality of satellites whose locations are known and received and processed to determine the present location of the LD antenna 15. Three or more reference LD stations 21-1, 21-2, 21-3, 21-4, whose locations are known with high accuracy, are located within a wide area or region R of diameter d at least 50–100 km and also receive and process the LD signals from the LD signal sources 19-j. Preferably d is in the range 50–5000 km. A roadway information module 25 provides local lane descriptions.

Each LD signal received at a reference station antenna 23-i (i=1, 2, 3, 4) is measured to estimate a pseudorange PR(t;i;j;est) from the LD signal source (j) to the receiving antenna at the reference station. The reference station 23-i also is provided, or computes, a theoretically correct pseudorange PR(t;i;j;theo) from the LD signal source (j) to the receiving antenna (i) at the reference station and subtracts the estimated pseudorange. The difference $$PRC(t;i;j)=6PR(t;i;j;theo)-PR(t;i;j;est) \quad (1)$$

represents a pseudorange correction for the LD signal transmitted at the LD signal source 19-j and received at the reference station 21-i. Each of the network of LD reference stations 21-i computes, or provides information to compute, the associated pseudorange correction function PRC(t;i;j), and these correction functions are provided for an LD master station 21, which may but need not coincide with one of the LD reference stations 21-i.

Optionally, the master LD station 21 determines and removes differences between the satellite clocks in order to synchronize these clocks, as in a wide area DGPS correction system described by Enge et al in U.S. Pat. No. 5,621,646. The Enge et al patent is incorporated by reference herein. In another approach, "Multi-Site Real-Time DGPS System Using Starfix Link: Operational Results," described by D. Lapucha and M. Huff, Proceedings of Fifth International Technical Meeting of the Satellite Division of the Institute of Navigation, Albuquerque, September 1992, a local reference station combines DGPS correction information for each visible satellite and broadcasts this local area correction information for use by local mobile stations.

In another approach, "GPS Wide Area Augmentation System (WAAS) Test Bed Results," by F. Haas, M. Lage and S Kalinowski, Proceedings of the Annual Meeting of the Institute of Navigation, Colorado Springs, June 1994, pseudorange correction information for each in-view satellite is determined by each subsidiary reference station and sent to a master reference station. The master reference station estimates and removes clock differences between the reference stations, now all referenced to a common clock; and forms an average of the pseudorange corrections for a common, in-view satellite for each subsidiary reference station. These averaged pseudorange corrections are then transmitted for use by each mobile station.

As part of the invention, the master station 21 optionally transmits clock corrections and ephemeris corrections, or pseudorange or other LD corrections, that are received by an LD correction signal receiver 18, carried on the vehicle 11, for subsequent use in correcting LD measurements over a wide area or region R.

If the LD signal antenna 15 is sufficiently close to one of the reference stations 23-i', the LD signal receiver 16 can monitor the pseudorange corrections PRC(t;i';j) applicable at that reference station and can add these corrections to its own pseudorange measurements, PR(t;LD;j), to obtain estimates of corrected pseudorange measurements $$PR(t;LD;j)_{corr,1}=PR(t;LD;j)+PRC(t;i';j) \quad (2)$$

for the LD antenna 15 and use these corrected pseudorange measurement corrections, referred to as DGPS signals, in Eq. (2) to obtain more accurate location coordinates for the LD antenna 15.

Alternatively, if the LD signal antenna 15 is not close to a reference station, the LD signal receiver 16 may: (1) estimate its own uncorrected location coordinates; (2) use the transmitted pseudorange corrections for two or more LD reference stations 21-i1 and 21-i2 that serve the region R, to estimate its own pseudorange corrections PRC(t;LD;j) from its estimated location relative to the known locations of the reference stations, 21-i1 and 21-i2, using LD correction signals received at an LD correction signal receiver 18; (3) estimate corrected pseudorange measurements for the LD antenna 15; and (4) use these corrected pseudorange measurements in Eq. (2) to obtain more accurate location coordinates for the LD antenna 15. Code phase pseudorange measurements, if suitably corrected and modified to remove ionospheric propagation time delay, tropospheric propagation time delay, receiver clock noise and the presence of multipath signals at the receiver, can allow estimation of LD signal antenna location coordinates that are accurate to within an estimated 10–50 cm, and often to within 10–25 cm.

However, one problem is communication of the pseudorange correction information from the LD reference stations 21-i or from the LD master station 21 to any LD signal receiver 16 within a wide area or region R, of the order of a 100 to 5000 km in diameter. One suitable communications approach is the Satellite Digital Audio Radio Service (SDARS), which is presently being developed to provide entertainment, weather information, one-way communication and similar signals for a vehicle. SDARS will operate in the S-band at 2.320–2.345 GHz. Outside the U.S., World Space operates similar communication channels within the L-band at 1.452–1.492 MHz. Presently, each of two companies, Satellite CD Radio, Inc. (SCDR) and American Mobile Radio Corporation (AMRC), has an eight-year FCC license to use a band of width 12.5 MHz within the S-band in the U.S. to provide programming and communication for fixed, mobile and portable radios.

In one format, 3 spot beams each use TDMA to carry 96 prime rate channels with a transmission rate of 16 kbps. These prime rate channels are combinable to carry broadcast channels of between 16 and 128 kbps; and the audio service components within the broadcast channels are encoded using MPEG layer 3. AMRC will initially provide SDARS service through two or three geosynchronous satellites, each with transmission power of up to 9.5 kilowatts.

One or both SDARS licensees plans to deploy terrestrial repeaters or "gap-fillers" to reach urban canyons and other hard-to-reach local regions. According to the terms of the licenses: (1) no programming can be originated in a gap-filler region, other than from the authorized SDARS satellites; (2) a terrestrial gap-filler cannot be used to extend SDARS coverage outside the satellites' authorized service areas; and (3) a terrestrial gap-filler can be implemented in a given region only after obtaining FCC authorization, which will require an adequate showing that (i) the repeating transmitter is located a sufficient distance from the Mexican and Canadian borders or will use a previously approved adjacent country co-frequency system of communication and (ii) the repeating transmitter will comply with Section 17.4 of the FCC rules and Sections 1.1301–1.1319 of the FCC's environmental rules. It is likely that the SDARS will be offered on a subscription basis with a small monthly service fee, not as a non-subscription, advertiser-supported service.

Another suitable communications approach is use of an FM subcarrier signal to transmit the required LD correction information, at an information transfer rate in the range 300–9600 kbps, to a subscriber vehicle. An FM subcarrier signal may have an associated frequency of about $f_c \pm 19$ kHz, where $f_c$ is a selected FM carrier frequency that lies in the range 88–108 MHz. Alternatively, a higher order displacement from the carrier frequency (e.g., $f_c \pm 38$ kHz or $f_c \pm 57$ kHz) may be used. The sources of these FM subcarrier signals may be a plurality of FM broadcasting stations located in or near a region where a vehicle operates. In this event, the subcarrier signals are obtained by filtering the total FM signals (carrier signal plus message signal plus subcarrier signal) to remove all but a subcarrier signal of a chosen frequency. Data transfer rate is about 300–9600 kbps. Because the carrier signal frequency used is relatively high, communication using an FM subcarrier signal may be limited to approximately line-of-sight transmissions, which are generally of the order of 20–60 miles (32–96 km).

A third suitable communications approach is the recently disclosed Sky Station system, for which information is available on the Internet at http://Hwww.skystation.com/faq.html. The Sky Station is a network of as many as 250 lighter-than-air vehicles (e.g., dirigibles), each having a transmitter or transceiver held in position at about 70,000 feet (about 21 km) elevation over a major metropolitan area. A large metropolitan area, such as London or Tokyo or Mexico City may have several lighter-than-air vehicles servicing the region. Each transmitter/transceiver provides 2–10 Mbps broadband, low latency communications service covers an area of about 7,500 miles$^2$ (about 19,000 km$^2$). The downlink and uplink bands used for this purpose will be 47.2–47.5 GHz and 47.9–48.2 GHz, respectively. Sky Station services will include Internet browsing, and hosting, provision of television-Internet access, full motion video, video conferencing, local and long distance telephony, on-line remote monitoring and security monitoring. The Sky Station system will become available in the year 2,000.

A fourth suitable communications approach, known as Private Radio, operates in a lower band (450–472 MHz) and is available on a seize-and-use basis. Where channels of 12.5–25 kHz width are used here, information transfer rates in the range 300–9600 kbps, and sometimes higher, are available. Any of the four communications systems discussed in the preceding paragraphs, or any similar system, can be used to communicate LD signal correction information to an LD signal receiver on a vehicle over a wide area or region R.

Where LD signals from 8 satellites or other LD signal sources are to be corrected, at a rate such as once every 0.6–2 sec, an LD correction signal transfer rate of 300–1200 bps for each source is suitable for normal intervals when LD signal source location data are not changing rapidly. When LD signal source location data are changing rapidly, for example, during an ephemeris data changeover period that can occur every two hours in GPS, the LD correction signal transfer rate may need to be increased, to 2400 bps or more per source (19,200 bps for eight sources).

FIG. 1 also illustrates a second embodiment of the invention, wherein one or more roadway segments is mapped using the received LD signals and LD correction signals and a mobile vehicle 11. In this embodiment, the vehicle 11 moves along a roadway segment, such as the lane 13B, so that its LD signal antenna 15 or some other selected location on the vehicle is displaced from a selected lane boundary, such as 13B-1 or 13B-2, by a selected, approximately constant, horizontal displacement distance or offset Δh, which may be zero. The LD signal receiver 16 (1) receives LD signals and LD correction signals as the vehicle 11 moves along the roadway 13, (2) determines a corrected present location of the LD antenna 16 as the vehicle moves and (3) stores the present location information in a memory module, optionally subtracting the offset Δh to provide a reasonably accurate estimate of the location coordinates at a sequence of locations along the selected lane boundary. Proceeding in this manner, all or a selected fraction of the boundary lanes for a selected segment of a roadway 13 can be mapped and stored for future use in guiding a vehicle along an arbitrary lane on the roadway segment. The memory module containing the boundary lane location coordinates is then optionally downloaded to a central database that will subsequently provide this roadway information for a subscriber vehicle.

Figure 2:
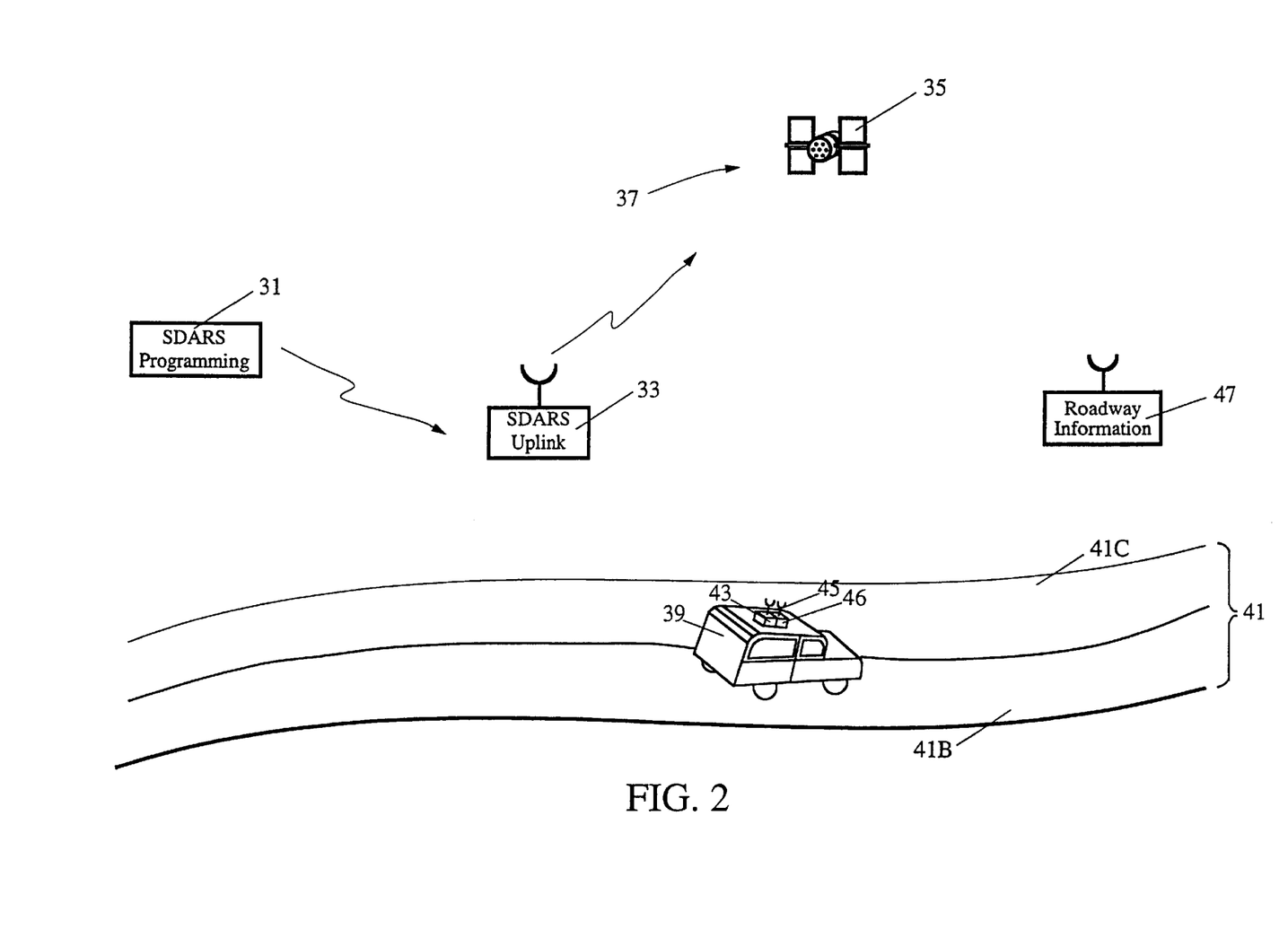
Figure 5:
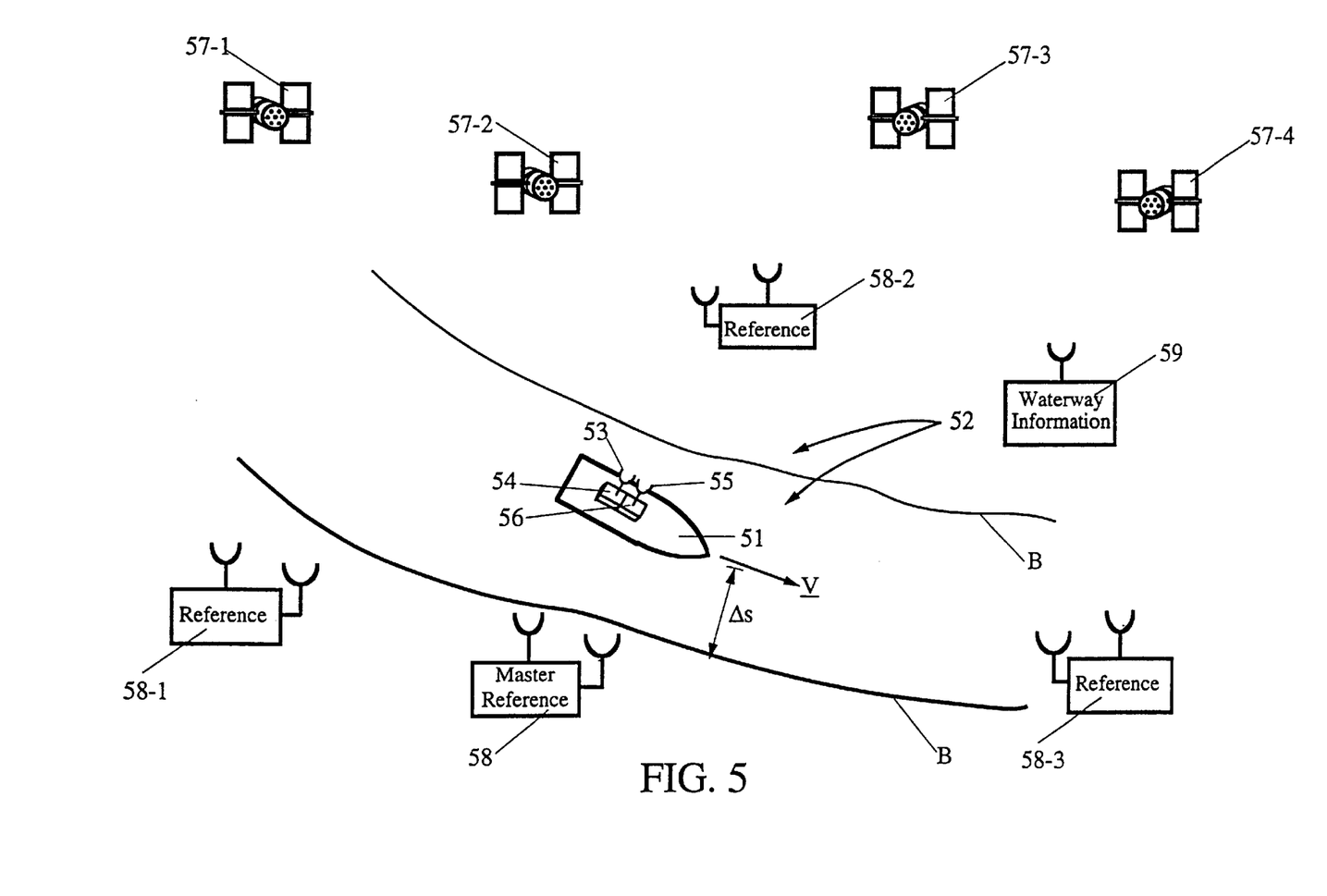

FIG. 2 illustrates one approach to broadcast of signals using the SDARS system. One or more signal sources (entertainment, news, weather, location correction information, etc.) provide uploadable SDARS programs and other uploaded information to an uplink facility 33, which formats and transmits this information to an SDARS signal-receiving antenna and receiver 35 on a selected SDARS satellite 37. The SDARS receiver 35 converts the carrier to an S-band (or L-band) carrier, if this has not already been done, and downloads or otherwise transmits the previously uploaded information to one or more subscriber vehicles or other users 39. Here, the vehicle 39 is shown as a land vehicle moving on in a selected lane 41B on a roadway 41; but the vehicle 39 may alternatively be a water vehicle moving along a waterway, as illustrated in FIG. 5.

The vehicle 39 in FIG. 2 carries an LD signal antenna 45 (which serves as surrogate for the user location) and associated LD signal receiver 46. The vehicle 39 also carries an SDARS signal antenna and receiver 43, which is connected to or may be a part of the LD receiver 46, that receives LD correction information. The SDARS receiver 43 (1) receives the downloaded SDARS programming from the SDARS antenna, (2) separates the LD correction information from the remainder of the received (audio) signals, (3) selects which LD signals are to be used in determining the location of the LD antenna 45, (4) applies the LD correction signals to correct the selected LD signals, and (5) uses the corrected LD signals to determine the present location of the LD signal antenna 45, and of the vehicle 39, with an inaccuracy of at most 10–50 cm, and preferably at most 10–25 cm. In step (2), the LD correction information may be identified, for example, by header information contained in the SDARS digital signal. The LD correction information is then processed by one or more processes for subsequent use by an LD signal receiver, and the remainder of the SDARS signals are subjected to other processes before presentation to a vehicle occupant as audio or other signals.

Figure 3:
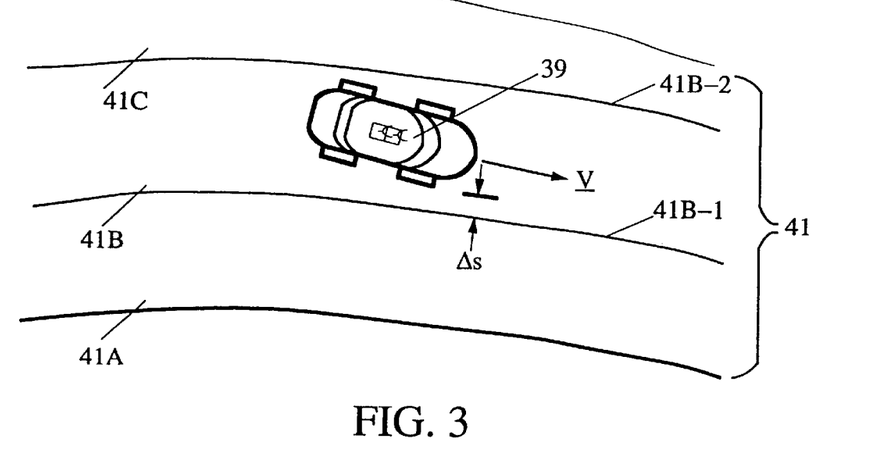

The vehicle 39 estimates and displays its present location relative to a pair of spaced apart linear or curvilinear line segments, 41B-1 and 41B-2, that indicate the boundaries of a selected roadway lane 41B, as illustrated in FIG. 3. Coordinates for the lane boundary line segments, 41B-1 and 41B-2, indicating the boundaries of the selected lane 41B, may reside in a roadway information database in the LD receiver 46 or may be downloaded upon demand from a nearby roadway information database 47 that provides boundary lane location coordinates for user-selected segments of a roadway.

Optionally, the LD signal receiver 46 also compares its present location coordinates, $(x_u(t), y_u(t), z_u(t))$, with location coordinates, $(x_u(t-\Delta t), y_u(t-\Delta t), z_u(t-\Delta t))$, taken at a preceding time and displays one or more difference measures, such as, $$v_x(t) = \{x_u(t) - x_u(t-\Delta t)\}/\Delta t, \quad (3A)$$

$$v_y(t) = \{y_u(t) - y_u(t-\Delta t)\}/\Delta t, \quad (3B)$$

$$v_z(t) = \{z_u(t) - z_u(t-\Delta t)\}/\Delta t, \quad (3C)$$

of how quickly the vehicle 39 is approaching one or the other of the lane boundaries 41B-1 or 41B-2. When the user 39 location actually crosses into an adjacent lane, such as 41A or 41C in FIG. 3, the LD receiver promptly substitutes new line segments as lane boundaries for the new selected lane. If one or more of the velocity components, such as $v_y(t)$, as computed in Eq. (3B), exceeds a selected threshold value, $v_{y,thr}$, the LD receiver 46 in FIG. 2 may generate and issue or transmit a visual, audible and/or alphanumeric alarm signal to alert someone—either a vehicle occupant or another person or computer—that the vehicle 39 is approaching a selected lane boundary at greater than a permissible velocity. The system may also display, in a graphical format and/or an alphanumeric format, a computed velocity of approach of the vehicle 39 toward a selected lane boundary.

A Wide Area LD correction system can also be used to monitor the approximate separation distance Δs between a vehicle and the nearest lane boundary. If the vehicle is too close to this lane boundary (e.g., within 20–50 cm or within 50–100 cm), the system can generate an audible or visual alarm.

Figure 4:
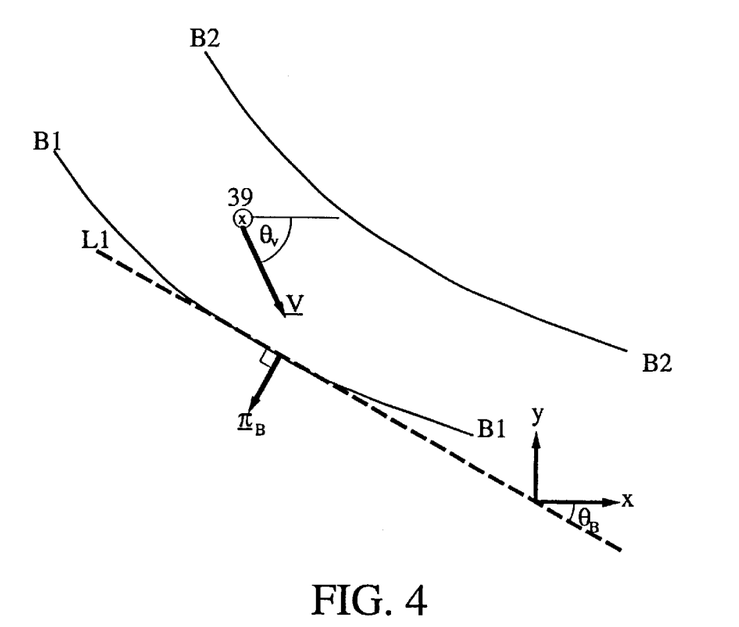
FIG. 4 illustrates lane boundary crossing by a vehicle.

FIGS. 3 and 4 schematically illustrate one method for determination of velocity of vehicle approach to a nearby lane boundary line B1—B1. This boundary line is locally approximately as a straight line segment L1—L1, which is oriented at an angle $\theta_B$ relative to the x-axis of a local, two-dimensional Cartesian coordinate system (x,y). In this coordinate system, the line segment L1—L1 has a unit length perpendicular or normal vector $\pi_B$, which is oriented at an angle $-(\theta_B+\pi/2)$ relative to the x-axis. The vehicle 39 is moving with a velocity vector v and angle $\theta_V$ relative to the x-axis, and is approaching the line segment L1—L1 (or lane boundary B1—B1) at a rate of $$v \cdot \pi_B = |v| \sin(\theta_V - \theta_B). \quad (4)$$

The magnitude $|v \cdot \pi_B|$ is compared with a selected threshold rate of approach $v_{thr}$ for audible or visual alarm signal purposes.

A third embodiment is useful to determine the location of a marine or water vehicle 51 (FIG. 5) relative to a (usually non-visible) boundary B for travel by the vehicle on a navigable waterway 52. Information on the boundary B is downloaded from a roadway information database, which database may be on board the vehicle or may be located apart from the vehicle 51. The boundary information may, for example, be (1) a curve that represents closest safe approach to a shoal or shoreline, based on local water depth, or (2) a boundary between two different legal jurisdictions, such as between Canada and the United States in the Saint Lawrence River or (3) a (preferably continuous) curve defined for other purposes. Here, an operator of the water vehicle 51 will seldom be able to determine visually an appropriate boundary curve.

The water vehicle 51 carries an LD signal antenna 53, an LD signal receiver and database 54, an LD correction signal antenna 55 and an LD correction signal receiver 56 (which may be part of the LD receiver 54) that receive LD signals and correction signals and accurately determine the vehicle location (and, optionally, the vehicle velocity vector). LD signals are received from two or more LD signal sources 57-1, 57-2, 57-3, 574, at the LD receiver 54 and at several LD reference stations 58-1, 58-2, 58-3 that serve a Wide Area LD correction system. The LD reference stations 58-1, 58-2, 58-3 and/or LD master reference station 58 provide LD correction information for the LD receiver 54. Optionally, the LD receiver 54 receives waterway boundary lane information from a waterway information database 59 that is spaced apart from the vehicle 51; or the LD receiver may receive such information to an on-board waterway information database.

The present location (and, optionally, the present velocity vector) of the vehicle 51 is compared with a geometric description of the boundary B contained in the database, and an alarm signal is optionally issued if (i) the vehicle is either too close to, or has crossed over, a lane boundary B or (ii) the vehicle is approaching the lane boundary B at a greater-than-threshold velocity.

Figure 6:
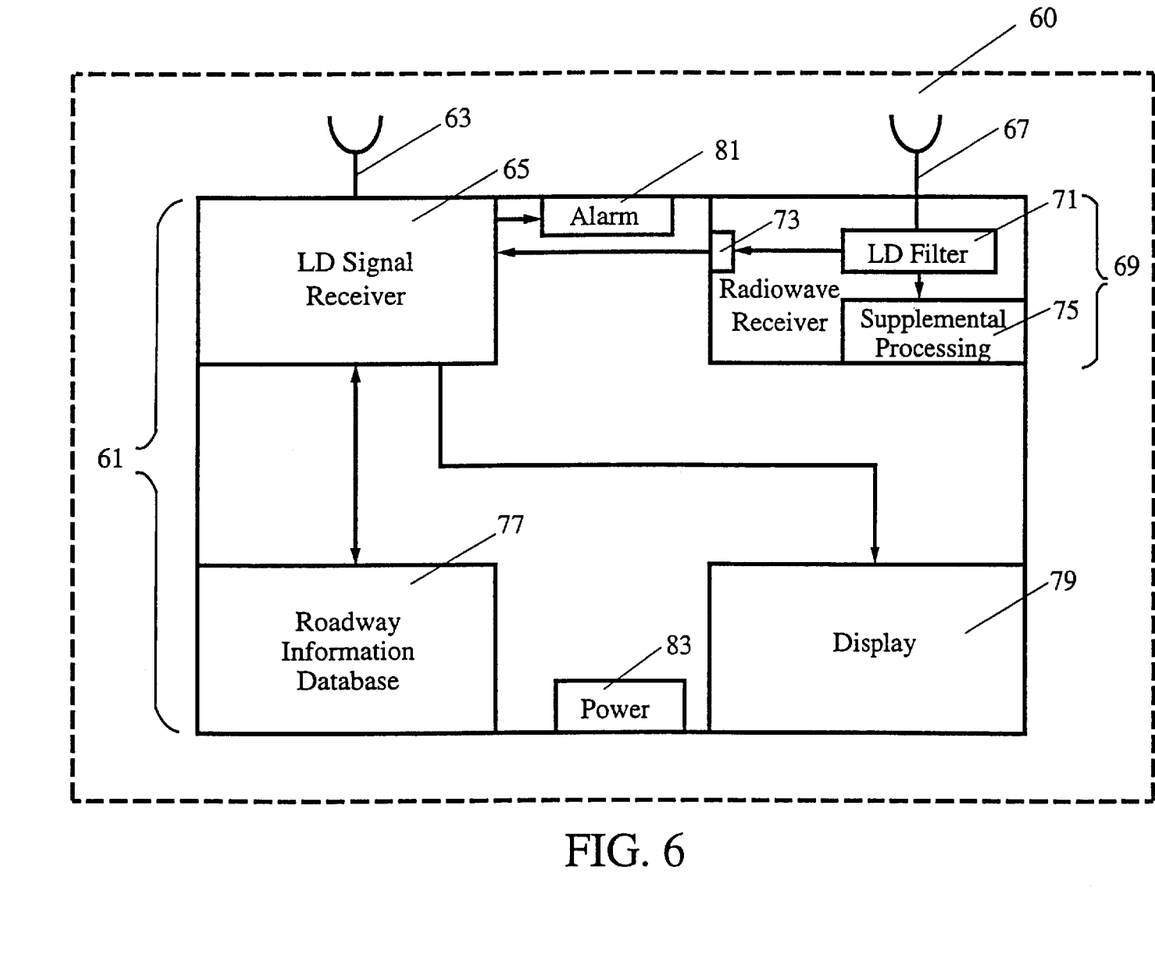
FIG. 6 illustrates apparatus for practicing the invention.

FIG. 6 schematically illustrates apparatus 61, carried on or installed in a vehicle 60, suitable for practicing the invention. The apparatus 61 includes an LD signal antenna 63 and associated LD signal receiver 65 that receive and process (uncorrected) LD signals from a plurality of LD signal sources, such as GPS or GLONASS or LEO satellites. The apparatus also includes a radiowave antenna 67 and associated radiowave receiver 69 that receives LD signal correction information and (optionally) other signals containing entertainment, news, weather information, one-way and/or two-way communication and similar signals (collectively referred to herein as "supplemental signal information"). The radiowave receiver 69 includes an LD signal filter 71, preferably implemented in software, that examines an incoming digital signal (e.g., the header and/or footer of an incoming signal) and separates LD signal correction information from other supplemental signal information. Optionally, the LD filter 71 directs the LD correction signal information to an LD signal port 73 that delivers this LD signal information to the LD signal receiver 65 for appropriate processing. The supplemental signal information is delivered by the LD filter to a supplemental processing module 75 (e.g., an audio signal processor) for delivery to a vehicle occupant in another format.

The radiowave receiver 69, LD signal filter 71, LD signal port 73 and supplemental processor 75 are optionally part of the LD signal receiver 65. The LD receiver 65 uses the LD signal information and the LD signal correction information to determine the location of the vehicle relative a lane of a roadway on which the vehicle 60 travels, with an associated inaccuracy that is no more than 10–50 cm, preferably no more than 10–25 cm.

The LD signal receiver 65 is connected to a roadway information database 77 that contains relevant information on each roadway or waterway in a given region, such as number of lanes, lanes allocated to vehicle travel in each direction, width of each lane and geometric description of each lane boundary. The LD receiver 65 determines the present location of the vehicle 60, locates the vehicle within a likely lane of a roadway or waterway, and optionally displays the vehicle location within the lane, using a graphical or alphanumeric display 79. Optionally, the apparatus also has a visual or audible alarm signal mechanism 81 that is connected to and is activated by the LD receiver 65 if the vehicle appears to be moving into a lane that is allocated to vehicle travel in an opposite direction. Power for the other components of the apparatus 60 is provided by a power sources 83.

An example of a Wide Area LD correction system, not including the means to transfer the LD correction information to a mobile user for navigation or tracking within a vehicle lane, is the Omnistar system in North America, which presently includes 11 reference station sites, at the following locations:

San Diego, Calif.
Redding, Calif.
Everett, Wash.
Duluth, Minn.

Long Island, N.Y.
Fayetteville, S.C.
Melbourne, Fla.
Pensacola, Fla.
Houston, Tex.
Mercedes, Tex.
Ciudad del Carmen (Yucatan Peninsula)

With the exception of the distance between the Houston and Mercedes sites and the distance between the Melbourne and Pensacola sites, the distance between any other pair of sites is several hundred km; and the distance between the Everett and Fayetteville sites is about 4,000 km. Thus, a vehicle placed anywhere in the continental U.S., including Alaska, will be several hundred km to several thousand km from at least two reference station sites in the Omnistar system.

The Omnistar system is similar to the GPS system discussed by Haas, Lage and Kalinowski, op cit, in which a central station (at Houston for Omnistar) receives and processes differential GPS corrections from each of a plurality of reference stations and provides an averaged DGPS correction for each visible satellite. This set of 10 reference stations and a master reference station provides reasonably good LD correction coverage for the 48 contiguous states, most of southern and western Canada, the eastern half of Alaska and substantially all of Mexico, although the 11 choices of site locations were not optimized to provide this coverage.

In one informal test of the accuracy of the Omnistar system, computed locations in the vicinity of one or another of the reference stations had associated inaccuracies of the order of 20–40 cm, which is within the desired range of inaccuracies required for a Wide Area LD correction system.

A Wide Area LD correction system with only a few reference stations can provide adequate coverage of the 48 contiguous states, and of Alaska, Canada and Mexico if desired, with a maximum inaccuracy (10–50 cm or, preferably, 10–25 cm) that is sufficient for tracking vehicle location within a lane. One important benefit of use of a Wide Area LD system, with relatively few reference stations, for vehicle tracking is that the total information transfer rate for LD correction information for all the reference stations is relatively small, an estimated 9.6–19.2 kbps, and can be provided by several different communication systems, such as SDARS, an FM subcarrier system, Sky Station and Private Radio.

By contrast, a real time kinematic (RTK) location determination system will provide corrected location coordinates with smaller inaccuracies (1–4 cm in some situations), but only over a small region, with an estimated maximum radius of about 40 km. It is estimated that more than 750 RTK reference stations would be required to provide adequate coverage of the 48 contiguous states, and this pattern would provide no coverage of Alaska and would cover only a small fraction of southern Canada and northern Mexico. Transfer of LD correction information for a network of this size would require an estimated 7.2–14.4 Mbps, and only a few communication systems today can provide such a high transfer rate.

What is claimed is:

1. A method for vehicle navigation on a selected lane on a vehicle path, the method comprising the steps of:

obtaining coordinates for a boundary line segment that helps define a selected lane on a selected path on which a vehicle travels;

receiving location determination (LD) signals and LD correction signals that allow estimation and correction of the present location of the vehicle, relative to the selected lane, with an inaccuracy that is no more than about 50 cm, where the LD correction signals are provided by at least three spaced apart LD correction signal sources, with at least two of the LD correction signals being produced by LD correction signal sources that are at least a selected distance d from the vehicle, where d is at least 50 km; and determining and displaying, in at least one of graphical form and alphanumeric form, the present location of the vehicle relative to the boundary line segment.

2. The method of claim 1, further comprising the step of selecting said distance d to be at least 100 km.

3. The method of claim 1, further comprising the step of selecting said distance d to be at least 500 km.

4. The method of claim 1, further comprising the step of selecting said distance d to be at least 1000 km.

5. The method of claim 1, further comprising the step of determining a velocity in a selected direction with which said vehicle approaches at said boundary line segment for said selected lane.

6. The method of claim 5, further comprising the step of providing an audible or visual alarm signal if said velocity with which said vehicle approaches said boundary line segment exceeds a selected threshold velocity value.

7. The method of claim 5, further comprising the step of displaying, in at least one of graphical form and alphanumeric form, said velocity with which said vehicle approaches said boundary line segment.

8. The method of claim 1, further comprising the step of providing an audible or visual alarm if said vehicle is closer than a selected threshold separation distance from said boundary line segment.

9. The method of claim 1, further comprising the step of selecting said vehicle path to be a roadway and selecting said vehicle to be a land vehicle.

10. The method of claim 1, further comprising the step of selecting said vehicle path to be a waterway and selecting said vehicle to be a water vehicle.

11. The method of claim 1, wherein said step of obtaining said coordinates for said boundary line segment comprises the step of receiving said coordinates from a roadway information database that is spaced apart from said vehicle.

12. The method of claim 1, wherein said step of obtaining said coordinates for said boundary line segment comprises the step of receiving said coordinates from a roadway information database that is on said vehicle.

13. The method of claim 1, wherein said step of receiving said LD corrections signals comprises receiving said LD correction signals from a communications system drawn from a group of communications systems consisting of Satellite Digital Audio Radio Service, FM subcarrier service, Sky Station and Private Radio.

14. The method of claim 1, wherein said step of receiving LD correction signals comprises the steps of:

receiving said LD correction signals as part of a composite signal that also contains at least one signal that is unrelated to said LD correction signals and to said LD signals; and separating said LD correction signals from the at least one signal that is unrelated to said LD correction signals and to said LD signals.

* * * * *